United States Patent
Chen

(10) Patent No.: US 11,435,025 B2
(45) Date of Patent: Sep. 6, 2022

(54) MULTIFUNCTIONAL HOLDER AND DISPLAY DEVICE USING THE SAME

(71) Applicants: BenQ Intelligent Technology (Shanghai) Co., Ltd, Shanghai (CN); BENQ CORPORATION, Taipei (TW)

(72) Inventor: Wei-Chieh Chen, Taoyuan (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 119 days.

(21) Appl. No.: 16/423,346

(22) Filed: May 28, 2019

(65) Prior Publication Data

US 2020/0103070 A1 Apr. 2, 2020

(30) Foreign Application Priority Data

Sep. 29, 2018 (CN) .......................... 201811147030.X

(51) Int. Cl.
*F16M 11/12* (2006.01)
*F16M 11/18* (2006.01)

(52) U.S. Cl.
CPC ............. *F16M 11/12* (2013.01); *F16M 11/18* (2013.01)

(58) Field of Classification Search
USPC ....... 248/123.11, 123.2, 125.7, 162.1, 406.2, 248/292.11, 297.11, 325, 331, 919, 920, 248/921, 922, 923
See application file for complete search history.

(56) References Cited

U.S. PATENT DOCUMENTS

| | | | | |
|---|---|---|---|---|
| 3,254,690 | A * | 6/1966 | Neuschotz | B25B 27/143 411/334 |
| 7,028,961 | B1 * | 4/2006 | Dittmer | F16M 11/04 248/278.1 |
| 7,954,780 | B2 * | 6/2011 | Dittmer | F16M 11/2092 248/284.1 |

(Continued)

FOREIGN PATENT DOCUMENTS

CN 102620125 A 8/2012
CN 104765873 A 7/2015

(Continued)

OTHER PUBLICATIONS

Office action of counterpart application by SIPO dated Oct. 21, 2019.

(Continued)

*Primary Examiner* — Alfred J Wujciak

(57) ABSTRACT

A multifunctional holder is provided for supporting a first object and a second object. The multifunctional holder includes a backboard assembly, an adapter, at least one movable arm and a positioning member. The backboard assembly is disposed on a back side of the first object. The adapter is connected to the backboard assembly. The at least one movable arm is connected to the adapter, wherein a first degree of rotational freedom is provided between the backboard assembly and the adapter, and a second degree of rotational freedom is provided between the adapter and the at least one movable arm. The positioning member is disposed on the backboard assembly or the adapter for fixing the second object.

10 Claims, 3 Drawing Sheets

(56) References Cited

U.S. PATENT DOCUMENTS

| | | | | |
|---|---|---|---|---|
| 7,971,840 | B2* | 7/2011 | Hirschhorn | F16M 11/14 248/281.11 |
| 8,724,037 | B1* | 5/2014 | Massey | F16M 11/06 348/836 |
| 8,777,172 | B2* | 7/2014 | Sapper | F16M 11/08 248/274.1 |
| 8,864,092 | B2* | 10/2014 | Newville | F16M 13/02 248/317 |
| 10,827,831 | B2* | 11/2020 | Ren | F21V 33/0012 |
| 2008/0067317 | A1* | 3/2008 | Altonji | F16M 11/2092 248/604 |
| 2008/0258029 | A1* | 10/2008 | Zhang | F16M 11/08 248/284.1 |
| 2012/0099851 | A1* | 4/2012 | Brown | F16M 13/00 396/421 |
| 2012/0112025 | A1* | 5/2012 | Smeenk | F16M 13/027 248/287.1 |
| 2014/0043516 | A1* | 2/2014 | Baker | F21V 33/0052 348/333.1 |
| 2014/0138506 | A1* | 5/2014 | Dahl | F16B 9/026 248/276.1 |
| 2015/0308618 | A1* | 10/2015 | Valero | F16M 11/2071 700/213 |
| 2016/0305600 | A1* | 10/2016 | Bowman | F16M 11/2021 |
| 2016/0348834 | A1* | 12/2016 | Xiang | F16M 11/2014 |
| 2017/0152987 | A1* | 6/2017 | Hung | F16M 11/2014 |
| 2018/0112820 | A1* | 4/2018 | Lau | F16M 11/24 |
| 2018/0252357 | A1* | 9/2018 | Kahn | F16M 13/02 |

FOREIGN PATENT DOCUMENTS

| | | |
|---|---|---|
| CN | 106021383 A | 10/2016 |
| CN | 106547739 A | 3/2017 |
| CN | 207162073 U | 3/2018 |
| CN | 207926785 U | 9/2018 |
| CN | 106555918 B | 3/2019 |

OTHER PUBLICATIONS

Office action of counterpart application by Taiwan IP Office dated Dec. 21, 2018.

* cited by examiner

MULTIFUNCTIONAL HOLDER AND DISPLAY DEVICE USING THE SAME

This application claims the benefit of People's Republic of China application Serial No. 201811147030.X, filed Sep. 29, 2018, the subject matter of which is incorporated herein by reference.

BACKGROUND OF THE INVENTION

Field of the Invention

The invention relates in general to a holder, and more particularly to a multifunctional holder.

Description of the Related Art

Normally, the display is stably erected on a desktop or a platform through a holder. Since the holder does not have a platform for fixing the camera, the camera needs to be additionally fixed on the desktop. When the orientation or angle of the display changes, the camera needs to adjust its position to capture the image in front of the display. This is indeed very inconvenient in terms of use.

SUMMARY OF THE INVENTION

The invention is directed to a multifunctional holder capable of enabling two objects such as the display and the camera to rotate simultaneously.

According to one embodiment of the invention, a multifunctional holder for supporting a first object and a second object is provided. The multifunctional holder includes a backboard assembly, an adapter, at least one movable arm and a positioning member. The backboard assembly is disposed on a back side of the first object. The adapter is connected to the backboard assembly. The at least one movable arm is connected to the adapter, wherein a first degree of rotational freedom is provided between the backboard assembly and the adapter, and a second degree of rotational freedom is provided between the adapter and the at least one movable arm. The positioning member is disposed on the backboard assembly or the adapter for fixing the second object.

According to one embodiment of the invention, a display device comprising a display, an electronic device and a multifunctional holder for supporting the display and the electronic device is provided.

The above and other aspects of the invention will become better understood with regards to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the invention, a multifunctional holder, such as a holder for supporting a display and related peripheral equipments used in e-sports game. In order to broadcast or live an e-sports competition, a network device must be connected to a camera arranged on the multifunctional holder to capture images of each participant and then transmit the captured images to a video platform or a community website for the online audience to watch. Since the participants may have different positions and angles with respect to the display, the camera arranged on the multifunctional holder needs to suitably adjust its orientation in order to capture required image. The multifunctional holder of the invention is disclosed in two embodiments below.

Figure 1A:
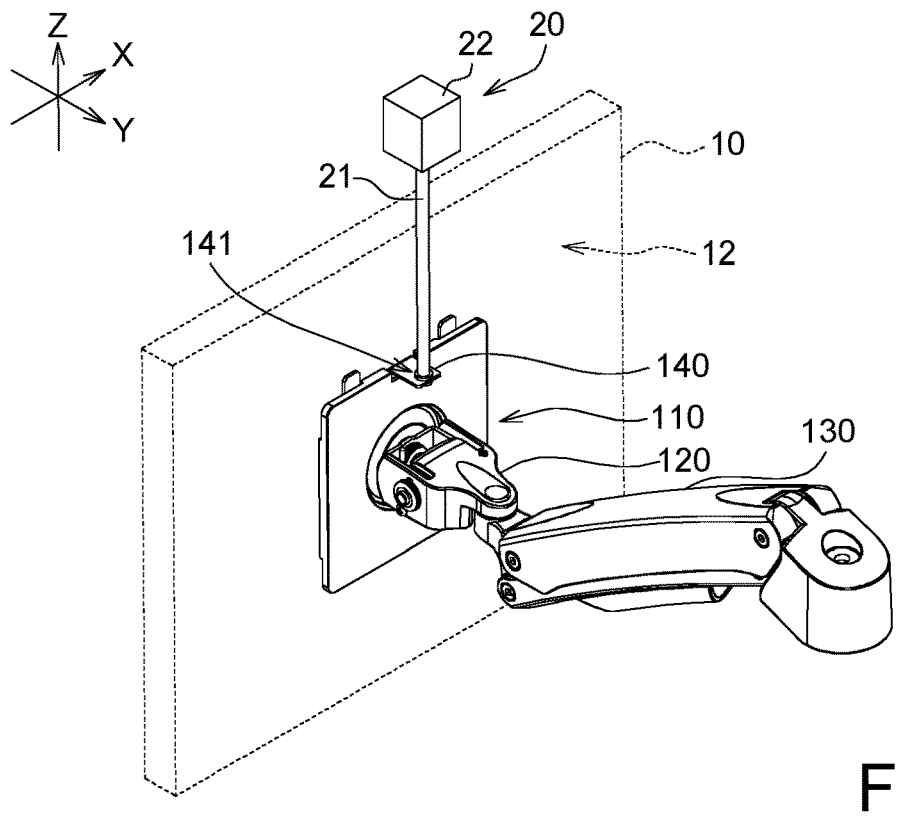
FIGS. 1A and 1B respectively are schematic diagrams of a multifunctional holder according to an embodiment of the invention, wherein the first object is represented by dotted lines.
Figure 1B:
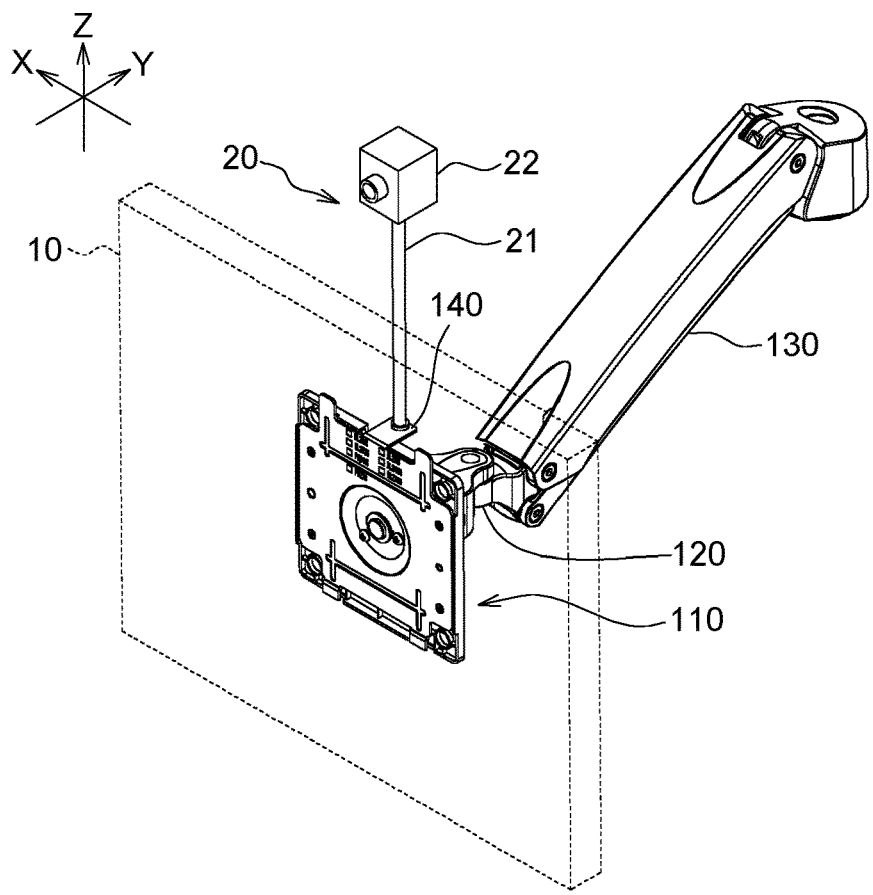

Refer to FIGS. 1A and 1B. In a first embodiment, the multifunctional holder 100 is provided for supporting a first object 10 and a second object 20. The multifunctional holder 100 includes a backboard assembly 110, an adapter 120, at least one movable arm 130 and a positioning member 140.

Figure 2A:
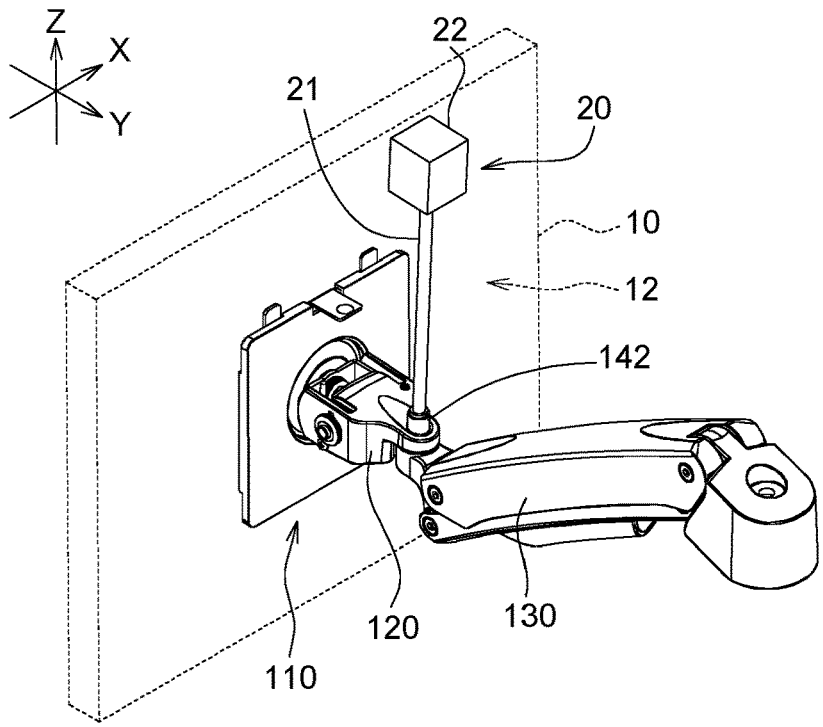
FIGS. 2A and 2B respectively are schematic diagrams of a multifunctional holder according to an embodiment of the invention.
Figure 2B:
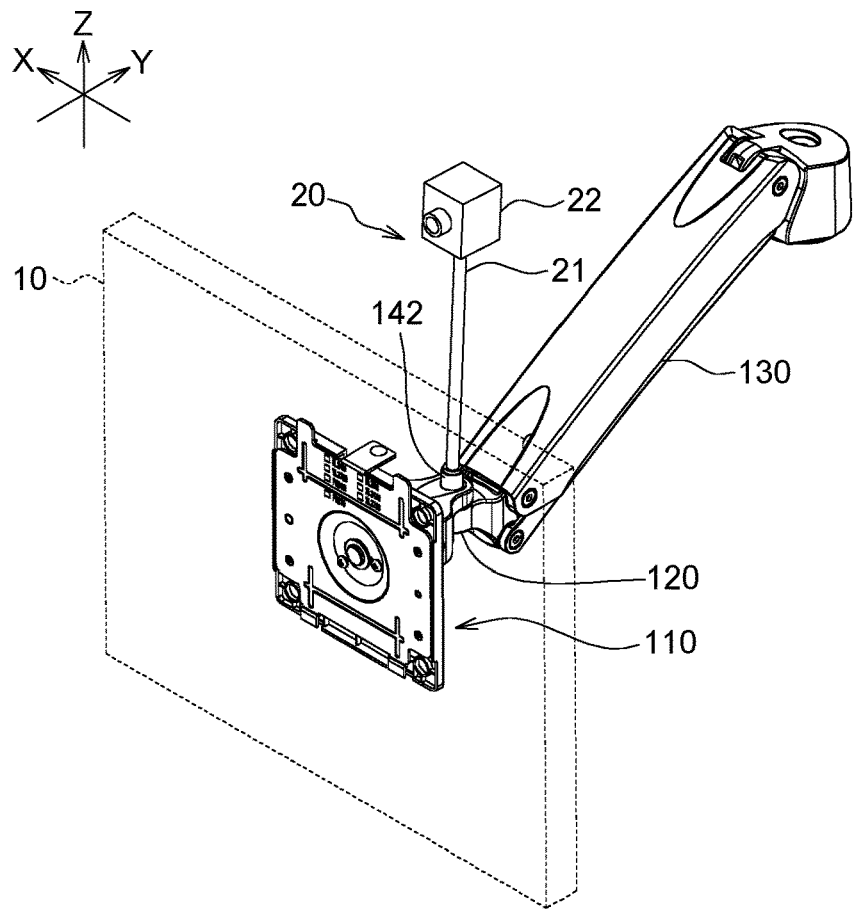

Refer to FIGS. 2A and 2B. In a second embodiment, the multifunctional holder 101 is provided for supporting a first object 10 and a second object 20. The multifunctional holder 100 includes a backboard assembly 110, an adapter 120, at least one movable arm 130 and a positioning member 142.

The first and the second embodiments disclosed above are similar, and are only different in that: in the first embodiment, the positioning member 140 is disposed on the backboard assembly 110 as shown in FIGS. 1A and 1B; in the second embodiment, the positioning member 142 is disposed on the adapter 120 as shown in FIGS. 2A and 2B. The positioning member 140, regardless being disposed on the backboard assembly 110 or the adapter 120, can enable the first object 10 and the second object 20 to rotate simultaneously. That is, the first object 10 and the second object 20 have the same rotation angle with respect to the adapter 120 or the at least one movable arm 130.

The backboard assembly 110 is disposed on a back side 12 of the first object 10. The first object 10 is, for example, a display, and the backboard assembly 110 can be disposed on the back side of the display.

In the first embodiment, the positioning member 140 is disposed at the top end of the backboard assembly 110 for positioning a second object 20, and the second object 20 can be a camera 22 and a stand 21, for example. The camera 22 can be disposed above the positioning member 140 through the stand 21, and can be extended across the top of the display to capture the image in front of the display or in different directions of the display.

A first degree of rotational freedom is provided between the backboard assembly 110 and the adapter 120 which are pivotally connected to each other. When the backboard assembly 110 rotates with respect to the adapter 120, the camera 22 and the stand 21 also rotate along with the backboard assembly 110 to adjust the azimuth (such as the yaw angle, the pitch angle, or the roll angle) of the camera 22. The first degree of rotational freedom is, for example, a degree of freedom rotating around the X-axis or the Y-axis, but the degree of rotational freedom between the backboard assembly 110 and the adapter 120 is not limited to rotate around one axis. That is, the degree of rotational freedom can be bi-axial, namely, the degree of rotational freedom can rotate around both the X-axis and the Y-axis.

Besides, a second degree of rotational freedom can be provided between the adapter 120 and the movable arm 130, which are pivotally connected to each other. When the adapter 120 horizontally rotates with respect to the movable arm 130, the camera 22 and the stand 21 also rotate along with the adapter 12 to adjust the azimuth (such as the yaw angle) of the camera 22. The second degree of rotational freedom is, for example, a degree of freedom rotating around the Z-axis, and is substantially perpendicular to the first degree of rotational freedom. Although only one movable arm 130 is illustrated in the diagram, the quantity of movable arm 130 is not limited to one, and can be two or more than two. Each movable arm 130 has a degree of rotational freedom rotating around the vertical-axis or the horizontal-axis.

In the first embodiment, the backboard assembly 110 and the positioning member 140 are formed of the same metal plate. That is, the positioning member 140 can be formed of the same metal plate used for forming the backboard assembly 110. The positioning member 140 can be a tongue formed by stamping the metal plate. The extending direction of the tongue is substantially perpendicular to the back side of the display.

The tongue has a positioning screw hole 141 for locking the second object 20. That is, one end of the stand 21 has a screw portion. The dimension of the screw portion is identical to the dimension of the positioning screw hole 126, such that the screw portion can be tightly engaged with the positioning screw hole 126 and make the stand 21 vertically disposed on the positioning member 140. The extending direction of the stand 21 is substantially perpendicular to the extending direction of the tongue.

In addition to the camera 22, the light emitting element, the network communication element or other objects can also be disposed on the positioning member 140, and the invention is not limited thereto.

In the second embodiment, the positioning member 142 is disposed on the adapter 120. The positioning member 142 can be a pivot. The adapter 120 rotates around the pivot and moves with respect to the at least one movable arm 130. The pivot is located on a vertical-axis (Z-axis), and the stand 21 can be vertically erected and fixed on the pivot. Therefore, when the adapter 120 horizontally moves with respect to the movable arm 130, the camera 22 and the stand 21 will rotate horizontally as well.

Figure 3:
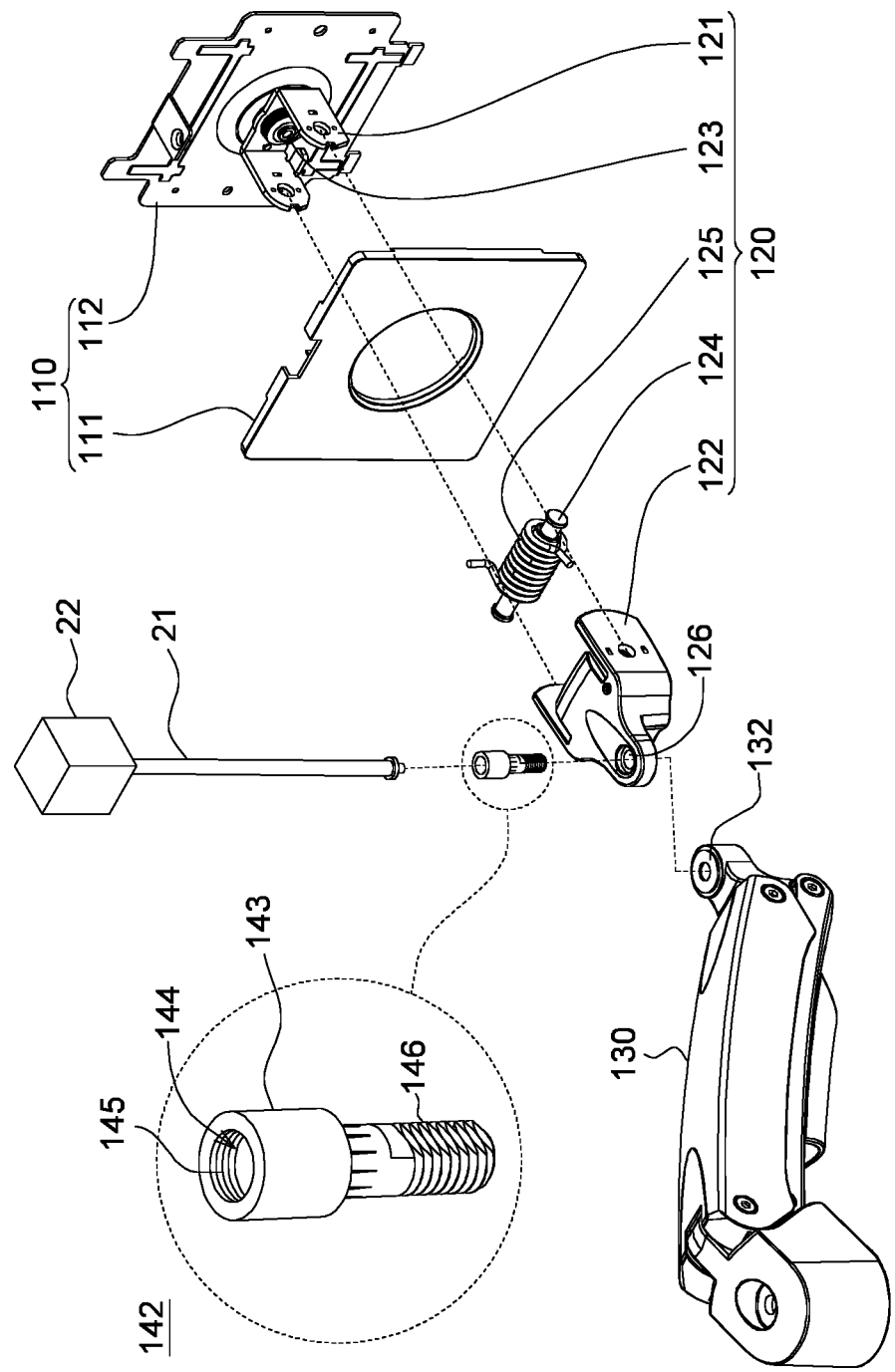
FIG. 3 is an explosion diagram and a partial enlargement of a multifunctional holder according to an embodiment of the invention.

Referring to FIG. 3, an explosion diagram and a partial enlargement of a multifunctional holder 101 according to an embodiment of the invention are shown. The backboard assembly 110 includes a covering plate 111 and a quick-release piece 112. The quick-release piece 112 can be engaged with or disengaged from the first object 10 through an elastic buckle. The quick-release piece 112 can be fixed on the back side of the display without using a locking element such as screw. Therefore, the quick-release piece 112 can be easily mounted or dismounted, and is easy and convenient to use. The adapter 120 includes a first frame 121, a second frame 122, a first rotation shaft 123, a second rotation shaft 124 and a spring 125. The first frame 121 is disposed on the quick-release piece 112 and rotates around the first rotation shaft 123. The second frame 122 is disposed on the first frame 121 and rotates around the second rotation shaft 124. The spring 125 is disposed on the second rotation shaft 124 and connected to the second rotation shaft 124 and the second frame 122 for providing a holding elasticity.

Refer to the partial enlargement of FIG. 3. The positioning member 142 includes a rod 143, an inner screw 145 and an outer screw 146. The rod 143 is disposed on the adapter 120. One end of the rod 143 has a groove 144. The inner screw 145 is disposed on an inner surface of the groove 144. The outer screw 146 is disposed on an outer surface of the rod 143. The rod 143 can pass through the shaft hole 126 of the second frame 122 and the shaft hole 132 of the movable arm 130 to screw the rod 143 on the movable arm 130 and the adapter 120 can rotate around the rod 143 using a fastener (not illustrated), such that the adapter 120 and the movable arm 130 can move with respect to each other.

The multifunctional holder disclosed in above embodiments of the invention is a holder used to fix two objects, such as a display and a camera, such that the two objects, such as the display and the camera, can rotate simultaneously. Therefore, when the orientation or angle of the display changes, the camera does not need to adjust its position to capture the image in front of the display. This is indeed very convenient in terms of use.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multifunctional holder provided for supporting a first object and a second object, wherein the multifunctional holder comprises:
   a backboard assembly disposed on a back side of the first object;
   an adapter connected to the backboard assembly;
   at least one movable arm connected to the adapter, wherein a first degree of rotational freedom is provided between the backboard assembly and the adapter, and a second degree of rotational freedom is provided between the adapter and the at least one movable arm, wherein the other end arm is fixed on surface; and
   a positioning member being a pivot disposed on the adapter, the positioning member having a groove for fixing the second object, and the adapter rotates around the pivot and moves with respect to the at least one movable arm,
   wherein the first object is a display, and the second object comprises an electronic device and a stand, the electronic device is a camera, a light emitting element or a network communication element.

2. The multifunctional holder according to claim 1, wherein the positioning member comprises a rod, an inner screw and an outer screw, the rod is disposed on the adapter, one end of the rod has the groove, the inner screw is disposed on an inner surface of the groove, and the outer screw is disposed on an outer surface of the rod.

3. The multifunctional holder according to claim 1, wherein the first object and the second object have a same rotation angle with respect to the adapter or the at least one movable arm.

4. A display device, comprising:
   a display;
   an electronic device; and
   a multifunctional holder provided for supporting the display and the electronic device, wherein the multifunctional holder comprises:

a backboard assembly disposed on a back side of the display;

an adapter connected to the backboard assembly;

at least one movable arm connected to the adapter, wherein a first degree of rotational freedom is provided between the backboard assembly and the adapter, and a second degree of rotational freedom is provided between the adapter and the at least one movable arm, wherein the other end arm is fixed on surface; and a positioning member being a pivot connected between the adapter and the at least one movable arm for fixing the electronic device.

5. The display device according to claim 4, wherein the positioning member comprises a rod, an inner screw and an outer screw, the rod is disposed on the adapter, one end of the rod has a groove, the inner screw is disposed on an inner surface of the groove, and the outer screw is disposed on an outer surface of the rod.

6. The display device according to claim 4, wherein the display and the electronic device have a same rotation angle with respect to the adapter or the at least one movable arm.

7. The display device according to claim 4, wherein the electronic device comprises a camera and a stand.

8. The display device according to claim 4, wherein the electronic device comprises a light emitting element and a stand.

9. The display device according to claim 4, wherein the electronic device comprises a network communication element and a stand.

10. A display device, comprising:

a display;

an electronic device; and a multifunctional holder provided for supporting the display and the electronic device, wherein the multifunctional holder comprises:

a backboard assembly disposed on a back side of the display;

an adapter connected to the backboard assembly;

at least one movable arm connected to the adapter, wherein a first degree of rotational freedom is provided between the backboard assembly and the adapter, and a second degree of rotational freedom is provided between the adapter and the at least one movable arm, wherein the other end arm is fixed on surface; and a positioning member for fixing the electronic device, wherein the positioning member is a pivot disposed on the adapter, and the adapter rotates around the pivot and moves with respect to the at least one movable arm, wherein the positioning member comprises a rod, an inner screw and an outer screw, the rod is disposed on the adapter, one end of the rod has a groove, the inner screw is disposed on an inner surface of the groove, and the outer screw is disposed on an outer surface of the rod.

* * * * *